United States Patent
Flor et al.

(10) Patent No.: US 11,023,684 B1
(45) Date of Patent: Jun. 1, 2021

(54) SYSTEMS AND METHODS FOR AUTOMATIC GENERATION OF QUESTIONS FROM TEXT

(71) Applicant: Educational Testing Service, Princeton, NJ (US)

(72) Inventors: Michael Flor, Lawrenceville, NJ (US); Brian W. Riordan, Pennington, NJ (US)

(73) Assignee: Educational Testing Service, Princeton, NJ (US)

( * ) Notice: Subject to any disclaimer, the term of this patent is extended or adjusted under 35 U.S.C. 154(b) by 101 days.

(21) Appl. No.: 16/357,400

(22) Filed: Mar. 19, 2019

Related U.S. Application Data

(60) Provisional application No. 62/644,766, filed on Mar. 19, 2018, provisional application No. 62/645,474, filed on Mar. 20, 2018, provisional application No. 62/648,464, filed on Mar. 27, 2018.

(51) Int. Cl.
*G06F 40/30* (2020.01)
*G06F 40/211* (2020.01)
*G06F 40/253* (2020.01)
*G06F 40/289* (2020.01)

(52) U.S. Cl.
CPC ............ *G06F 40/30* (2020.01); *G06F 40/211* (2020.01); *G06F 40/253* (2020.01); *G06F 40/289* (2020.01)

(58) Field of Classification Search
CPC .... G06F 8/313; G06F 16/24537; G06F 40/30; G06F 40/211; G06F 40/253; G06F 40/289; G06F 16/334; G06F 16/3344; G06F 40/40; G06N 3/0454; G06N 5/022; G09B 7/00; G09B 7/02; G10L 15/1815; G10L 15/26
USPC ......... 434/362; 704/1, 9, 4; 706/46; 707/723
See application file for complete search history.

(56) References Cited

U.S. PATENT DOCUMENTS

| | | | |
|---|---|---|---|
| 7,027,974 B1 * | 4/2006 | Busch | G06F 40/253 704/4 |
| 10,387,560 B2 * | 8/2019 | Allen | G06F 40/186 |
| 10,592,519 B2 * | 3/2020 | He | G06F 16/2462 |
| 10,592,603 B2 * | 3/2020 | Carter | G06F 8/313 |
| 2006/0053000 A1 * | 3/2006 | Moldovan | G06F 16/243 704/9 |

(Continued)

OTHER PUBLICATIONS

Agarwal, Manish, Mannem, Prashanth; Automatic Gap-Fill Question Generation from Text Books; Proceedings of the 6th Workshop on Innovative Use of NLP for Building Educational Applications; Portland, Oregon; pp. 56-64; Jun. 2011.

(Continued)

*Primary Examiner* — Gerald Gauthier
(74) *Attorney, Agent, or Firm* — Jones Day

(57) ABSTRACT

Computer-implemented systems and methods are described herein for automatically generating questions from text. Text including one or more sentences is received. A sentence, comprising a predicate and one or more arguments associated with the predicate, is parsed from the text. Semantic role labels are assigned to the one or more arguments associated with the predicate. One or more questions are automatically generated relating to the predicate based on the assigned semantic role labels. Each answer to the generated questions is one of the one or more arguments associated with the predicate.

20 Claims, 9 Drawing Sheets

(56) References Cited

U.S. PATENT DOCUMENTS

| | | | |
|---|---|---|---|
| 2008/0319735 A1* | 12/2008 | Kambhatla | G06F 40/30 704/9 |
| 2009/0089045 A1* | 4/2009 | Lenat | G06F 40/30 704/9 |
| 2010/0235164 A1* | 9/2010 | Todhunter | G06F 40/35 704/9 |
| 2013/0204611 A1* | 8/2013 | Tsuchida | G06F 40/40 704/9 |
| 2014/0222743 A1* | 8/2014 | Baughman | G06F 40/205 706/46 |
| 2014/0272904 A1* | 9/2014 | Bagchi | G06N 5/00 434/362 |
| 2015/0127323 A1* | 5/2015 | Jacquet | G06F 40/211 704/9 |
| 2015/0261849 A1* | 9/2015 | Chu-Carroll | G06F 16/334 707/723 |
| 2017/0162190 A1* | 6/2017 | Wakaki | G10L 15/1815 |
| 2017/0193088 A1* | 7/2017 | Boguraev | G06F 40/284 |
| 2017/0199928 A1* | 7/2017 | Zhao | G06F 16/9024 |
| 2017/0293679 A1* | 10/2017 | Boguraev | G06F 16/24578 |
| 2017/0293680 A1* | 10/2017 | Boguraev | G06F 16/3329 |
| 2018/0096617 A1* | 4/2018 | Tapuhi | G06Q 10/0639 |
| 2019/0043379 A1* | 2/2019 | Yuan | G06N 3/02 |
| 2019/0163745 A1* | 5/2019 | Beller | G09B 5/02 |
| 2020/0034422 A1* | 1/2020 | Ferrucci | G06N 7/005 |

OTHER PUBLICATIONS

Ali, Husam, Chau, Yllias, Hasan, Sadid; Automation of Question Generation From Sentences; Proceedings of the 3rd Workshop on Question Generation; pp. 58-67; 2010.

Araki, Jun, Rajagopal, Dheeraj, Sankaranarayanan, Sreecharan, Holm, Susan, Yamakawa, Yukari, Mitamura, Teruko; Generating Questions and Multiple-Choice Answers Using Semantic Analysis of Texts; Proceedings of COLING, the 26th International Conference on Computational Linguistics: Technical Papers; Osaka, Japan; pp. 1125-1136; Dec. 2016.

Becker, Lee, Basu, Sumit, Vanderwende, Lucy; Mind the Gap: Learning to Choose Gaps for Question Generation; Proceedings of the Conference of the North American Chapter of the Association for Computational Linguistics: Human Language Technologies; Montreal, Canada; pp. 742-753; Jun. 2012.

Chali, Yllias, Golestanirad, Sina; Ranking Automatically Generated Questions Using Common Human Queries; Proceedings of the 9th International Natural Language Generation Conference; Edinburgh, UK; pp. 217-221; Sep. 2016.

Chang, Angel, Manning, Christopher; SUTime: Evaluation in TempEval-3; Second Joint Conference on Lexical and Computational Semantics, vol. 2: Seventh International Workshop on Semantic Evaluation; Atlanta, GA; pp. 78-82; Jun. 2013.

Collobert, Ronan, Weston, Jason, Bottou, Leon, Karlen, Michael, Kavukcuoglu, Koray, Kuksa, Pavel; Natural Language Processing (Almost) from Scratch; Journal of Machine Learning Research, 12; pp. 2493-2537; 2011.

Danon, Guy, Last, Mark; A Syntactic Approach to Domain-Specific Automatic Question Generation; arXiv:1712.09827; 2017.

Du, Xinya, Cardie, Claire; Identifying Where to Focus in Reading Comprehension for Neural Question Generation; Proceedings of the Conference on Empirical Methods in Natural Language Processing; Copenhagen, Denmark; pp. 2067-2073; 2017.

Du, Xinya, Shao, Junru, Cardie, Claire; Learning to Ask: Neural Question Generation for Reading Comprehension; Proceedings of the 55th Annual Meeting of the Association for Computational Linguistics, vol. 1: Long Papers; Vancouver, Canada; pp. 1342-1352; 2017.

Fellbaum, Christiane; WordNet: An Electronic Lexical Database; MIT Press; 1998.

Godwin, Keith, Piwek, Paul; Collecting Reliable Human Judgements on Machine-Generated Language: The Case of the QG-STEC Data; Proceedings of the 9th International Natural Language Generation Conference; Edinburgh, UK; pp. 212-216; Sep. 2016.

Heilman, Michael, Smith, Noah; Good Question! Statistical Ranking for Question Generation; Proceedings of the Annual Conference of the North American Chapter of the Association for Computational Linguistics: Human Language Technologies; Los Angeles, California; pp. 609-617; Jun. 2010.

Heilman, Michael, Smith, Noah; Rating Computer-Generated Questions with Mechanical Turk; Proceedings of the North American Chapter of the Association for Computational Linguistics: Human Language Technologies: Workshop on Creating Speech and Language Data with Amazon's Mechanical Turk; Los Angeles, California; pp. 35-40; Jun. 2010.

Huang, Yan, He, Lianzhen; Automatic Generation of Short Answer Questions for Reading Comprehension Assessment; Natural Language Engineering, 22(3); pp. 457-489; May 2016.

Kalady, Saidalavi, Elikkottil, Ajeesh, Das, Rajarshi; Natural Language Question Generation Using Syntax and Keywords; Proceedings of the 3rd Workshop on Question Generation; Pittsburgh, PA; pp. 1-10; Jun. 2010.

Lindberg, David, Popowich, Fred, Nesbit, John, Winne, Phil; Generating Natural Language Questions to Support Learning On-Line; Proceedings of the 14th European Workshop on Natural Language Generation; Sofia, Bulgaria; pp. 105-114; Aug. 2013.

Luong, Minh-Thang, Pham, Hieu, Manning, Christopher; Effective Approaches to Attention-Based Neural Machine Translation; Proceedings of the 2015 Conference on Empirical Methods in Natural Language Processing; Lisbon, Portugal; pp. 1412-1421; Sep. 2015.

Mannem, Prashanth, Prasad, Rashmi, Joshi, Aravind; Question Generation from Paragraphs at UPenn: QGSTEC System Description; Proceedings of the 3rd Workshop on Question Generation; Pittsburgh, PA; pp. 84-91; Jun. 2010.

Mazidi, Karen, Nielsen, Rodney; Leveraging Multiple Views of Text for Automatic Question Generation; Artificial Intelligence in Education; 2015.

Mazidi, Karen, Tarau, Paul; Infusing NLU into Automatic Question Generation; Proceedings of the 9th International Natural Language Generation Conference; Edinburgh, UK; pp. 51-60; Sep. 2016.

Palmer, Frank; The English Verb, 2d Edition; Longman: London, UK; 1987.

Palmer, Martha, Kingsbury, Paul, Gildea, Daniel; The Proposition Bank: An Annotated Corpus of Semantic Roles; Computational Linguistics, 31(1); pp. 71-106; 2005.

Rajpurkar, Pranav, Zhang, Jian, Lopyrev, Konstantin, Liang, Percy; SQuAD: 100,000+ Questions for Machine Comprehension of Text; Proceedings of the Conference on Empirical Methods in Natural Language Processing; Austin, Texas; pp. 2383-2392; Nov. 2016.

Rodrigues, Hugo, Coheur, Luisa, Nyberg, Eric; QGaSP: A Framework for Question Generation Based on Different Levels of Linguistic Information; Proceedings of the 9th International Natural Language Generation Conference; Edinburgh, UK; pp. 242-243; Sep. 2016.

Serban, Iulian Vlad, Garcia-Duran, Alberto, Gulcehre, Caglar, Ahn, Sungjin, Chandar, Sarath, Courville, Aaron, Bengio, Yoshua; Generating Factoid Questions With Recurrent Neural Networks: The 30M Factoid Question-Answer Corpus; Proceedings of the 54th Annual Meeting of the Association for Computational Linguistics; Berlin, Germany; pp. 588-598; Aug. 2016.

Strotgen, Jannik, Gertz, Michael; HeidelTime: High Quality Rule-Based Extraction and Normalization of Temporal Expressions; Proceedings of the 5th International Workshop on Semantic Evaluations; Uppsala, Sweden; pp. 321-324; Jul. 2010.

Vanderwende, Lucy; The Importance of Being Important: Question Generation; Workshop on the Question Generation, Shared Tasks and Evaluation Challenge; pp. 1342-1352; 2008.

Varga, Andrea, Ha, Le An; WLV: A Question Generation System for the QGSTEC 2010 Task B; Proceedings of the 3rd Workshop on Question Generation; pp. 80-83; 2010.

Verhagen, Marc, Sauri, Roser, Caselli, Tommaso, Pustejovsky, James; SemEval-2010 Task 13: TempEval-2; Proceedings of the 5th International Workshop on Semantic Evaluation; Uppsala, Sweden; pp. 57-62; Jul. 2010.

(56) References Cited

OTHER PUBLICATIONS

Wolfe, John; Automatic Question Generation From Text: An Aid to Independent Study; Proceedings of the ACM SIGCSE-SIGCUE Technical Symposium on Computer Science Education; pp. 104-112; 1976.

Yao, Xuchen, Bouma, Gosse, Zhang, Yi; Semantics-Based Question Generation and Implementation; Dialogue and Discourse, 3(2); pp. 11-42; 2012.

Mazidi, Karen, Nielsen, Rodney; Pedagogical Evaluation of Automatically Generated Questions; Proceedings of the 12th International Conference on Intelligent Tutoring Systems; Honolulu, Hawaii; pp. 294-299; 2014.

Gates, Donna; Generating Look-Back Strategy Questions from Expository Texts; Workshop on the Question Generation Shared Task and Evaluation Challenge; 2008.

Liu, Ming, Calvo, Rafael, Rus, Vasile; G-Asks: An Intelligent Automatic Question Generation System for Academic Writing Support; Dialogue and Discourse, 3(2); pp. 101-124; 2012.

Pennington, Jeffrey, Socher, Richard, Manning, Christopher; GloVe: Global Vectors for Word Representation; Proceedings of the Conference on Empirical Methods in Natural Language Processing; pp. 1532-1543; 2014.

Rus, Vasile, Wyse, Brendan, Piwek, Paul, Lintean, Mihai, Stoyanchev, Svetlana, Moldovan, Cristian; The First Question Generation Shared Task Evaluation Challenge; Proceedings of QG2010: The Third Workshop on Question Generation; pp. 45-57; 2010.

\* cited by examiner

Average Human-Assigned Scores for Auto-Generated Questions

| Scale | SRL-YNQ | SRL-CQ | NN |
|---|---|---|---|
| Grammar | 4.32 | 3.89 | 3.75 |
| Semantics | 4.34 | 3.79 | 2.61 |
| Relevance | 2.75 | 2.52 | 1.65 |
| Total | 11.41 | 10.20 | 8.01 |

Figure 5

SYSTEMS AND METHODS FOR AUTOMATIC GENERATION OF QUESTIONS FROM TEXT

This application claims priority to U.S. Provisional Application No. 62/644,766 filed on Mar. 19, 2018, entitled "System for Automatic Generation of Questions from Text;" U.S. Provisional Application No. 62/645,474 filed on Mar. 20, 2018, entitled "System for Automatic Generation of Questions from Text;" and U.S. Provisional Application No. 62/648,464 filed on Mar. 27, 2018, entitled "Semantic Role-Based Approach to Open-Domain Automatic Question Generation," the entireties of which are herein incorporated by reference.

FIELD

The technology described herein relates generally to question generation and more specifically to automatically generating questions from text using a semantic role-based approach.

BACKGROUND

It is often desirable to formulate questions about an excerpt of text, especially in the educational sector when assessing a student's reading or language skills. But, manual generation of questions from text is a time-consuming and inefficient task. As such, automatic question generation (AQG) is an important and challenging research area in natural language processing. AQG systems can have particularly beneficial education applications, such as reading comprehension assessments, intelligent tutoring, dialogue agents, and instructional games.

SUMMARY

In accordance with the teachings herein, computer-implemented systems and methods are provided for automatically generating questions from text. An embodiment of a method for automatically generating one or more questions from text comprises receiving text including one or more sentences and parsing a sentence from the text, wherein the sentence comprises a predicate and one or more arguments associated with the predicate. The method further comprises assigning semantic role labels to the one or more arguments associated with the predicate and automatically generating one or more questions relating to the predicate. Questions generation is based on the assigned semantic role labels, wherein each answer to the one or more questions is one of the one or more arguments associated with the predicate.

A computer-implemented system for automatically generating one or more questions from text is further described herein, wherein the system comprises one or more data processors and one or more computer-readable storage mediums encoded with instructions for commanding the one or more data processors to execute steps that include the aforementioned method. A non-transitory computer-readable storage medium is further described herein, wherein the storage medium comprises instructions for which when executed cause a processing system to execute steps comprising the aforementioned method.

BRIEF DESCRIPTION OF THE DRAWINGS

FIG. 5 depicts results of a comparison study between two automatic question generation systems.

DETAILED DESCRIPTION

Computer-implemented systems and methods are provided herein for automatically generating questions from text. The systems and methods utilize a semantic role-based approach to open-domain automatic question generation.

Figure 1:
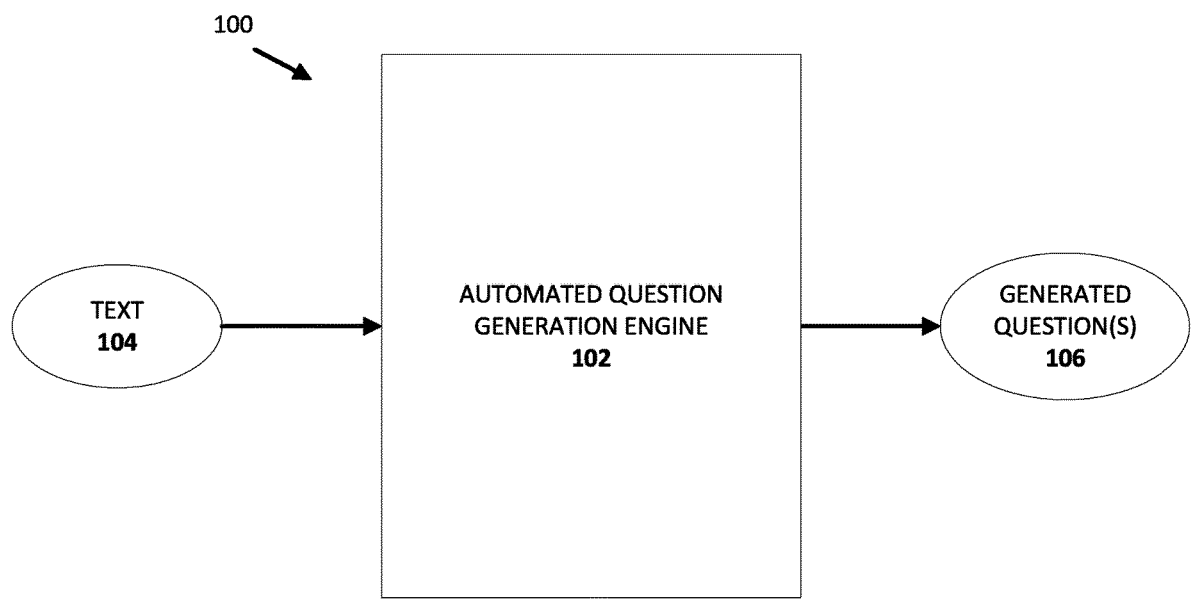
FIG. 1 is a block diagram depicting the generation of questions from text in a computer-implemented environment.

FIG. 1 depicts a computer-implemented environment 100 for question generation via an automated question generation (AQG) engine 102. In embodiments, text 104 is input into the AQG engine 102. Text 104 can be one sentence, more than one sentence, an excerpt from an entire body of text, an entire body of text, etc. The AQG engine 102 then automatically outputs one or more generated questions 106 corresponding to the inputted text 104. Generated questions 106 are typically either constituent questions (i.e., wh-questions: who, what, when, where, why) or yes-or-no questions. For example, if the sentence "John is a painter" is input into the AQG engine 102, the output may include "What is John?" (i.e., wh-question) and/or "Is John a painter?" (i.e., yes-or-no question). Embodiments of the AQG engine can be used to generate questions from reading passages to gauge a student's reading comprehension, to conduct formative assessments, to test language development, to engage in intelligent tutoring, or to perform various other evaluations. In embodiments, the AQG engine can formulate questions for all types of sentences, including copular sentences (e.g., sentences with a "linking verb," such as forms of be, become, feel, or seem).

Figure 2:
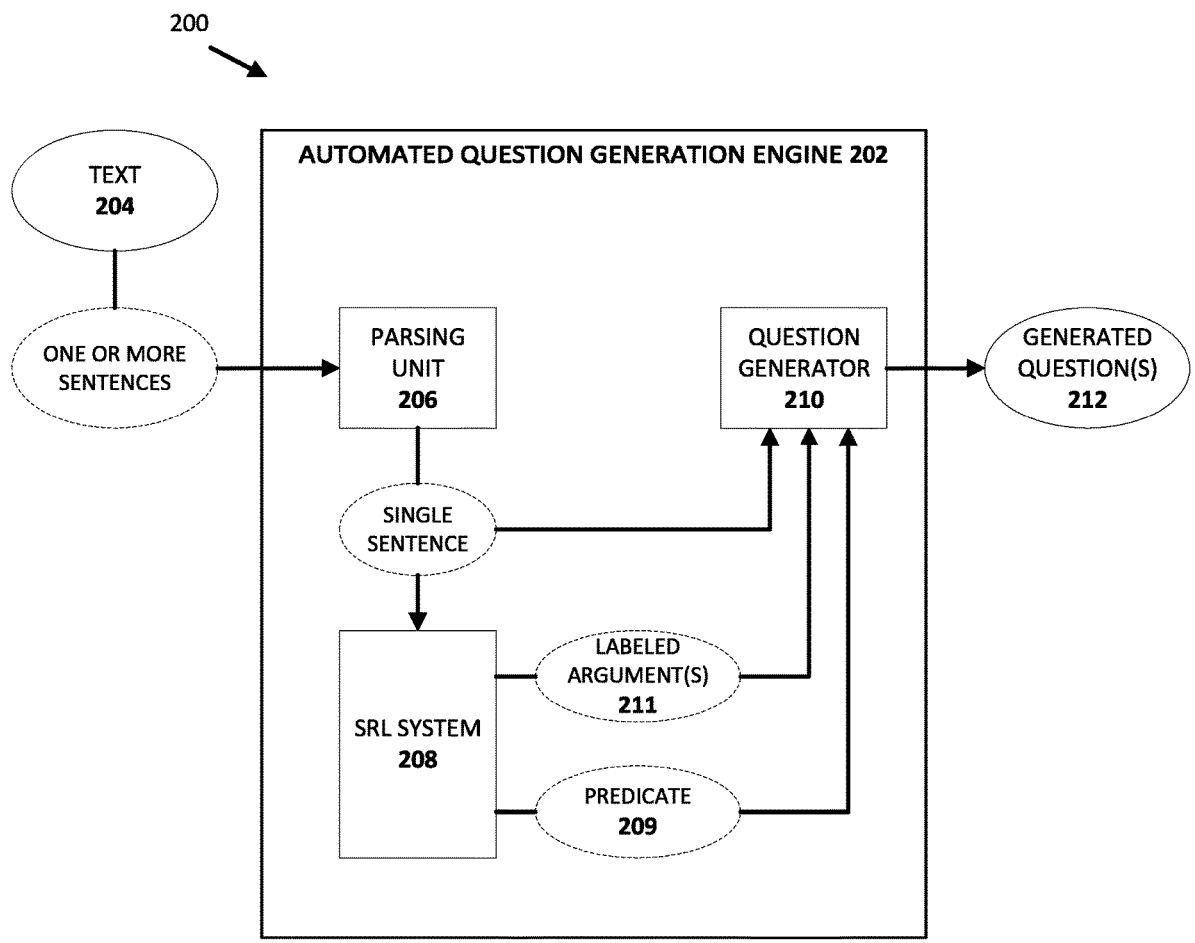
FIG. 2 is a block diagram depicting the processing of text to generate questions in a computer-implemented environment.

FIG. 2 depicts data flow through an embodiment of an AQG engine 202 in a computer-implemented environment 200. In the depicted embodiment, one or more sentences are introduced into the AQG engine 202 as text 204. Text 204 is received by a parsing unit 206. In embodiments where text 204 comprises more than one sentence, parsing unit 206 extracts a single sentence from text 204 for initial processing. The single sentence then passes to the semantic role labeling (SRL) system 208.

SRL system 208 isolates a predicate (e.g., the part of a sentence that contains the verb and gives information about the subject) of the sentence and assigns labels to the arguments associated with that predicate. At its basics, SRL analyzes a sentence into who did what to whom, how and when . . . . In one embodiment, all non-auxiliary verbs in the sentence are considered predicates. Semantic roles include the generalized core arguments of verbs, i.e., A0, A1, . . . , A5, and a set of adjunct modifiers that includes AM-TMP (time), AM-LOC (location), AM-DIR (direction), AM-MNR (manner), AM-CAU (cause), AM-PNC (purpose), AM-EXT (extent), AM-DIS (discourse), AM-ADV (adverbial), AM-NEG (negation), and AM-MOD (modal verbs). An example of an SRL system is the SENNA system for Semantic Role Labeling, which produces semantic role labels according to the Propbank 1.0 specifications. It is understood that any SRL system can be utilized, and the aforementioned labels may vary accordingly.

In some embodiments, it is necessary to double check the SRL system 208 for errors in labeling before question generation. For instance, some SRL systems assign the A1 role to subjects instead of A0. Using the previous example "John is a painter," an SRL system may incorrectly produce: [$_{A1}$ John] is [$_{A1}$ a painter]. Because A1 is the label in this particular embodiment reserved for direct objects, it is necessary to remap [$_{A1}$ John] to a category treated as a grammatical subject for questions generation. This type of post-processing can be completed by the system itself or aided by an external source, such as an automated correction system.

When SRL system 208 has labeled each argument associated with a predicate, the labeled arguments 211 and predicate 209 are passed to the questions generator 210. In embodiments, the parsed sentence may contain more than one predicate. In such instances, SRL system 208 isolates the next predicate and labels its associated arguments, repeating the process until all predicates have been isolated and their respective arguments labeled.

Question generator 210 processes each predicate 209 and labeled argument 211 to formulate questions 212. To produce a question 212, question generator 210 selects a focal argument—the argument about which the question will be asked. The text of the chosen focal argument then becomes the expected answer to the question. In the aforementioned example where "John is a painter," question generator 210 may select the focal argument: [$_{A1}$ a painter]. The generated question "What is John?" would have the focal argument as its answer—"a painter."

In an embodiment, question generator 210 creates questions from all of the major arguments (e.g., A0, A1, . . . , A5) and the adjunct arguments AM-TMP (time), AM-MNR (manner), AM-CAU (cause), AM-LOC (location), AM-PNC (purpose), and AM-DIR (direction) mentioned previously. But it is understood that questions could be formulated for a variety of other arguments, including those identified in reference to SRL system 208 above.

The process of producing questions involves intricate decisions by the system. There are at least three issues: (1) selecting the appropriate question word for the semantic argument, (2) deciding on "What" versus "Who," and (3) handling prepositions. For constituent questions, selecting the appropriate wh-word is aided by the identity of the focused argument in embodiments. Manner arguments (AM-MNR) invite "How" and location arguments (AM-LOC) invite "Where." But it is not always so simple. Consider, for example, semantic role A4, which is often used for the "end point" of complex locative constructions. A sentence like "They can fly from here [$_{A4}$ to any country], should generate a question beginning with "Where." A similar construction in "Antarctica doesn't belong [$_{A4}$ to any country]" should not produce a "Where" question.

Additionally, in some cases it is difficult to decide whether to produce a "Who" or a "What" question—particularly when evaluating subjects and direct objects. In embodiments, question generator 210 may make a rule-based decision to determine the proper question word by examining the part-of-speech of the focal argument, the presence of pronouns, a check in a large gazetteer of first and last person names (about 130K entries in the exemplar implementation), and a lookup into a list of person-denoting words (e.g., king, senator, etc.). If the argument is a whole phrase, a careful analysis is required. For example, "king of the land" requires a "Who" question, but "a hat for a lady" requires a "What" question.

As discussed, relying only on the SRL designation for a focal argument is too general to formulate an adequate question in some embodiments. In such instances, question generator 210 analyzes the parsed sentence and retains the preposition (when present) associated with the focal argument for the formation of question-sequences. This is well illustrated when generating wh-questions for temporal arguments (AM-TMP), for example. The AM-TMP label does not distinguish between time points, durations, and sets (i.e., repetitive temporal specifications). Therefore, it is difficult to determine whether a when-question, a how long question, or a how often question is proper for an AM-TMP argument. Consider:

(1) [$_{A0}$ Peter] called [$_{AM-TMP}$ on Monday].
(2) [$_{A0}$ Peter] called for [$_{AM-TMP}$ six hours].
(3) [$_{A0}$ Peter] called [$_{AM-TMP}$ every day].

Each of the arguments are labeled AM-TMP, but their corresponding proper questions are: (1) When did Peter call?; (2) For how long did Peter call?; and (3) "How often did Peter call?"

Analyzing prepositions can aid in the sub-classification of temporal expressions to generate a proper question-sequence. For instance, prepositions "every" and "each" hint at how often questions, "for" hints at how long questions, while many other prepositions hint at time point descriptions requiring when-questions. As such, embodiments of question generator 210 analyze prepositions when formulating questions and retain the prepositions to be used in the questions. Prepositions may also be retained for the formation of question word-sequences for non-temporal semantic arguments. For example, by retaining the preposition in the sentence "The bird sat on the branch," question generator 210 may generate the question "On what did the bird sit?"

In embodiments, question generator 210 also detects and analyzes verbal groups in the parsed sentence to aid in question generation. In an English language clause, a verbal group is the main lexical verb and its related modifiers—negation, auxiliary verbs, and modals. A sentence with multiple clauses may have several verbal groups. Question generator 210 utilizes part-of-speech and lexical patterns to identify such verbal groups and, once identified, analyzes the tense, grammatical aspect, verb negation, modality, and grammatical voice (passive/active) to formulate proper questions for the labeled arguments.

In some embodiments, it is necessary to link the verbal group to the verb of the detected predicate. In the presence of auxiliary verbs, SRL systems (like SENNA) produce multiple analyses for the same chunk of text, with some being systemically incorrect. The analysis can be corrected by utilizing the separately detected verbal group. This type of post-processing can be completed by the system itself or aided by an external source, such as an automated correction system.

In embodiments, question generator 210 may formulate yes-or-no questions for each predicate that has a finite verb (thus excluding bare- and to-infinitives and gerunds). When a sentence contains multiple predicates, multiple yes-or-no questions can be generated—one for each predicate. An example method for generating a yes-or-no question is as follows: First, the system selects from a clause all semantic role-fillers for the current predicate. Then, the sequential position of SRL arguments is rearranged, if necessary. For yes-or-no questions, the standard declarative word order (usually subject-object-verb) is preserved. Do-support (inclusion of forms of the auxiliary verb "do") is provided when needed, based on the detection and analysis of verbal groups. Constructions that do not require do-support include copular, modals, and cases when an auxiliary be/have/do verb is already present. Additionally, adjunct arguments may be moved relative to the main verb. For example, a generated yes-or-no question for the sentence "He quickly ate" may be "Did he eat quickly?" The generated question includes the addition of do-support in the form of "did," and changes the order of the adjunct argument "quickly" in relation to the main verb "ate."

In embodiments, yes-or-no questions may be posed in positive mode. An analysis of the verbal group of the predicate will provide question generator 210 information about the explicit negation of the main verb, including contracted negation, such as "didn't" and "couldn't." In these instances, the question generation process may avoid transferring the negation into the question, while simultaneously registering that the correct answer is flipped from "yes/no" to "no/yes." For example, from "Johnny didn't know the song," a question generator 210 generating positive mode questions may derive "Did Johnny know the song?" (Answer: "No"); and for the copula "The tea isn't sweet enough," question generator 210 generating positive mode questions may derive "Is the tea sweet enough?" (Answer: "No").

After question generator 210 formulates questions 212 for each focal argument of each predicate in the sentence, parsing unit 206 extracts the next sentence (when present) from text 204 for question generation. This process continues until one or more questions have been generated for all sentences of text 204.

Figure 3:
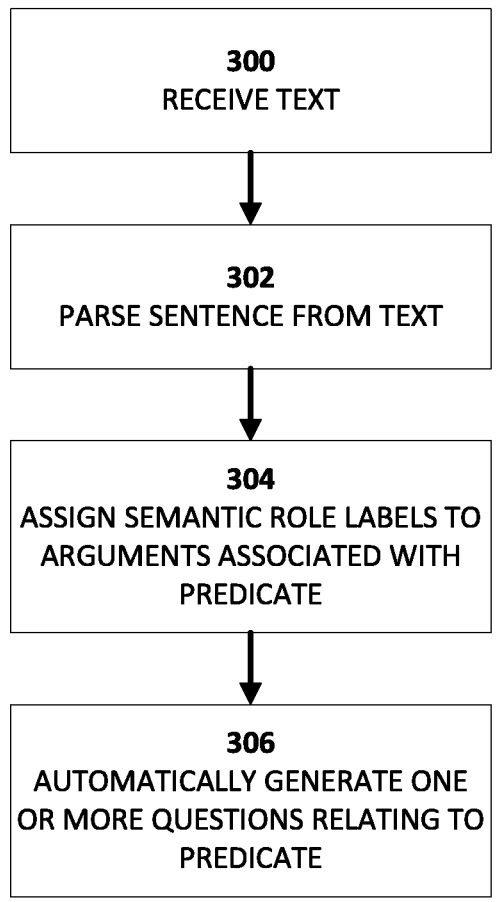
FIG. 3 is a flow diagram depicting an example method for generating questions for a single predicate.

FIG. 3 depicts an example method for automatically generating questions from text. At 300, the system receives the text. As mentioned above, the text can include one or more sentences. Generally, each sentence comprises at least one predicate and one or more arguments associated with the predicate.

At 302, a sentence is parsed from the text. When the text only comprises one sentence, that sentence is selected. When the text comprises more than one sentence, a single sentence from the text is parsed for initial processing. Then, the remaining sentences are analyzed individually in succession. After a single sentence is parsed, semantic role labels are assigned to each argument associated with a predicate in that sentence in the manner described above in reference to FIG. 2 (304). Then, at 306, one or more questions are automatically generated relating to the predicate. As discussed above, question generation is based on the semantic role labels assigned to the predicate's associated arguments.

Figure 4:
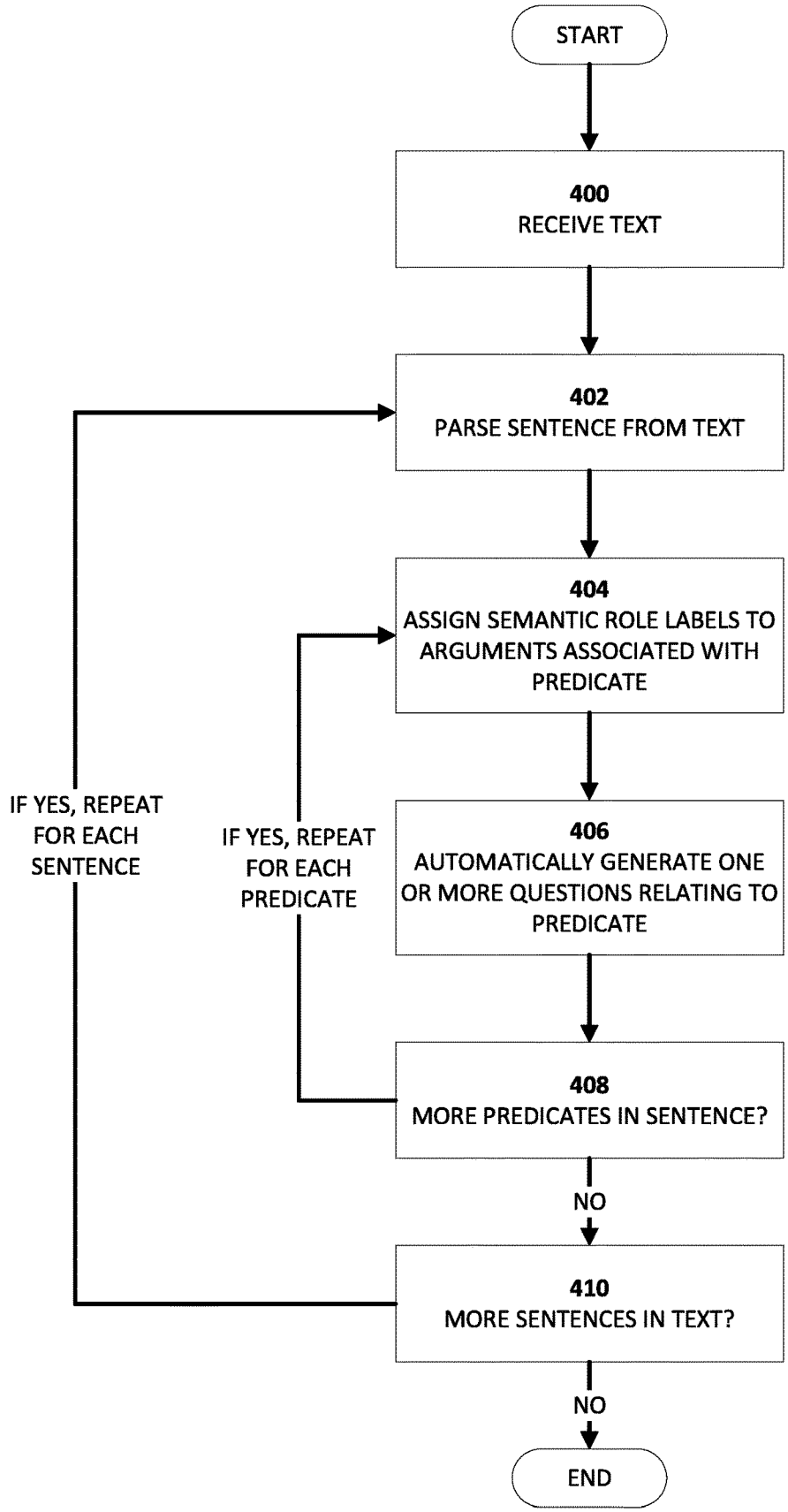
FIG. 4 is a flow diagram depicting an example method for generating questions for one or more predicates and one or more sentences.

FIG. 4 depicts an example method for automatically generating questions for each predicate of each sentence of text. At 400, the system receives the selected text. At 402, a single sentence is parsed from the text, as described above in reference to step 302 of FIG. 3. After a single sentence is parsed, semantic role labels are assigned to each argument associated with a predicate in that sentence in the manner described above (404). Then, at 406, one or more questions are automatically generated for the predicate based on the semantic role labels assigned to its associated arguments.

Next, at 408, the system determines if there is more than one predicate in the parsed sentence. When more than one predicate is present, the process repeats beginning at 404—semantic role labels are assigned to each argument associated with the next predicate and questions are generated relating to that next predicate. The process continues in this fashion until questions are generated for each predicate of the parsed sentence. When only one predicate is present in a sentence, or after every predicate of the sentence is processed, the system then determines if there is more than one sentence in the text (410). When the text contains more than one sentence, the process repeats from 402 with the parsing of a next sentence from the text. The next sentence is processed using the same method as the first sentence described above. The method continues to repeat in this pattern until questions are generated relating to each predicate of each sentence of the text.

An evaluation of AQG systems and methods indicate that the SRL-based system described herein is superior in many respects to a system utilizing a neural network for question generation. The neural network system chosen for comparison was an LSTM (long short term memory)-based system trained over a large corpus of question-answer pairs from Wikipedia. Given an input sentence, the system generates questions based on the encoded input and what the model has learned about plausible question generation content and form from the training data.

In the comparison study, each system's ability to produce good questions for some pre-selected amount of text, focusing only on the question-generation capabilities, was evaluated. Five expository texts were selected for input into the system, comprising a total of 171 sentences. Both the neural and the SRL-based systems were tasked to generate questions for each of the 171 sentences.

The SRL-based system generated at least one question for 165 sentences and failed to provide output for 6 sentences. Overall, the SRL-based system generated 890 questions and averaged 5.4 questions for each sentence. There are two reasons for this abundance, both described in more detail above: First, the system attempts to generate a yes-or-no question for each predicate in each sentence. Thus, it generated 236 yes-or-no questions. Next, the system attempts to generate a constituent question for almost each argument of each predicate in each sentence. Thus, the system generated 654 constituent questions. The neural system generated one question for each of 170 sentences (and failed for one sentence). All questions generated by the neural system resembled constituent questions.

In total 1,060 questions were automatically generated for evaluation across both systems. The questions were annotated by linguistic experts and rated on three scales: Grammar, Semantics, and Relevance. The grammar and semantic scales were five-point scales, ranging from (1) severely mangled/nonsensical to (5) well-formed/adequate. The relevance scale was a four-point scale, ranging from (0) too mangled to judge relevance to (3) the question is about the sentence.

To estimate the quality of the generated questions, the average ratings for three groups of questions were compared: (1) yes-or-no and (2) constituent questions from the SRL-based system (SRL-YNQ and SRLCQ), and (3) questions from the neural system (NN). ANOVA analyses were conducted for each of the three rating scales and the total score across each question group.

Results depicting the average rating for each group of questions are presented in FIG. 5. As shown in the table, yes-or-no questions generated by the SRL-based system (SRL-YNQ) (n=236), were rated significantly higher than constituent questions from the SRL-based system (SRL-CQ) (n=654), which, in turn, were rated significantly higher than questions from the neural system (NN) (n=170). All comparisons were statistically significant (p<0.001), except for SRL-CQ vs. NN on grammar.

Next, the automatically generated questions were analyzed based on their potential to be useful. A potentially useful question was determined to be one that has a reasonably good grammar (rating≥4), is semantically sensible in context (rating≥4) and is relevant to the information conveyed in the text (rating≥2). The criteria was analyzed with two measures: First, the proportion of questions having a total rating≥10 was determined. Among the SRL-YNQ questions, 81% were deemed potentially useful, compared to 64% among SRL-CQ questions, and 29% among questions generated by the neural network. A second, more stringent measure required that a question meet the criteria above on each of the three scales, i.e. Grammar≥4, Semantics≥4, and Relevance≥2. With this measure, the proportion of potentially useful questions was 71% for SRL-YNQ questions, 50% for SRL-CQ questions, and 15% for the neural network-generated questions.

The comparison study indicates that the herein described SRL-based system can generate a relatively high percentage of questions that are potentially usable as-is in an application, achieving good ratings for grammaticality, semantic coherence, and relevance. The SRL system is able to generate particularly high quality yes-or-no questions, as demonstrated by the strong scores from the human raters. Another strength demonstrated by the SRL-based system is the ability to systematically generate multiple constituent questions by focusing on each argument of a predicate in a clause, as described in detail above.

The methods and systems described herein may be implemented using any suitable processing system with any suitable combination of hardware, software and/or firmware, such as described below with reference to the non-limiting examples of FIGS. 5, 7A, 7B, and 7C.

Figure 6:
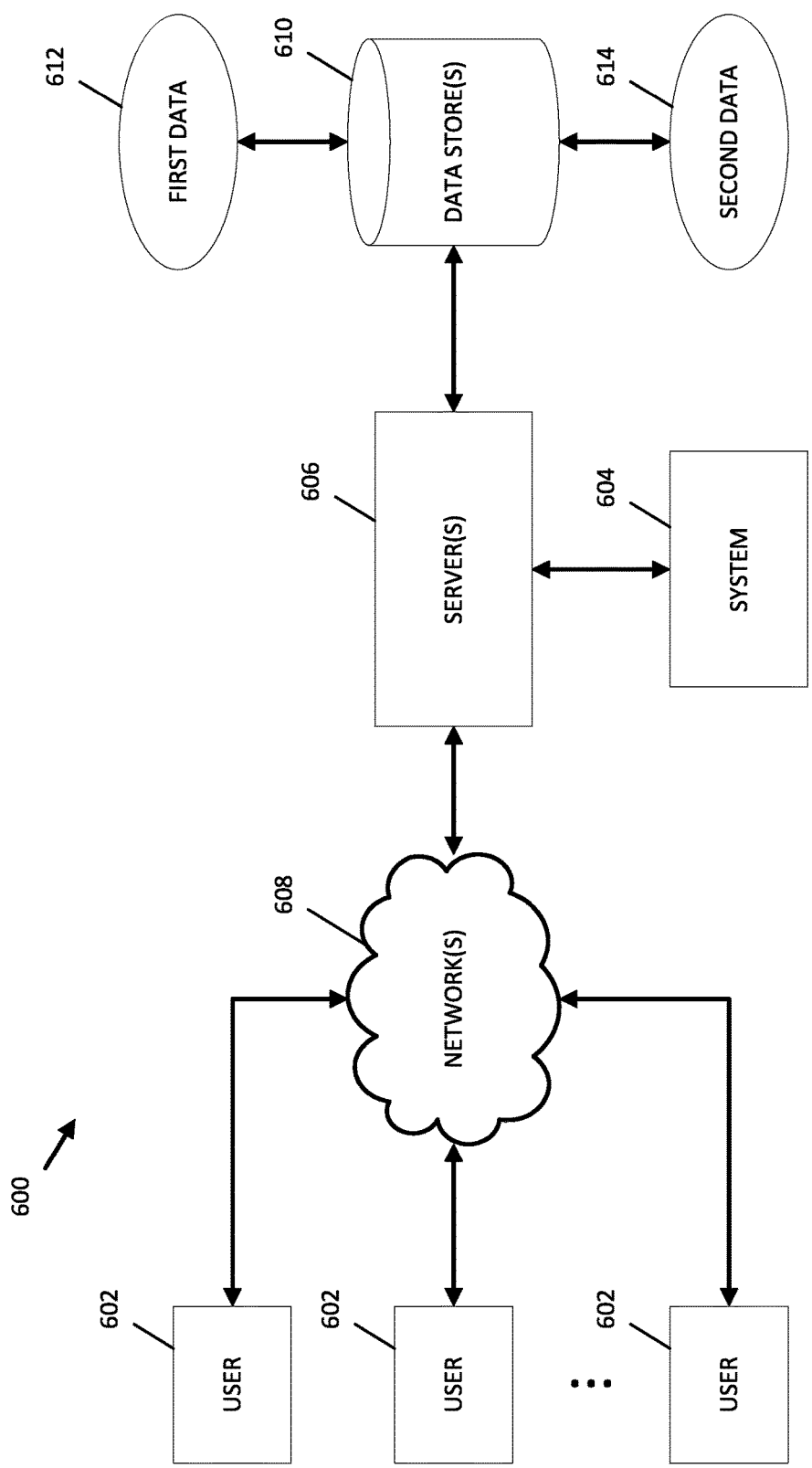
FIG. 6 depicts a computer-implemented environment wherein users can interact with an automated question generation system.

FIG. 6 depicts at 600 a computer-implemented environment wherein users 602 can interact with a system 604 hosted on one or more servers 606 through a network 608. The system 604 contains software operations or routines. The users 602 can interact with the system 604 through a number of ways, such as over one or more networks 608. One or more servers 606 accessible through the network(s) 608 can host system 604. It should be understood that the system 604 could also be provided on a stand-alone computer for access by a user.

Figure 7A:
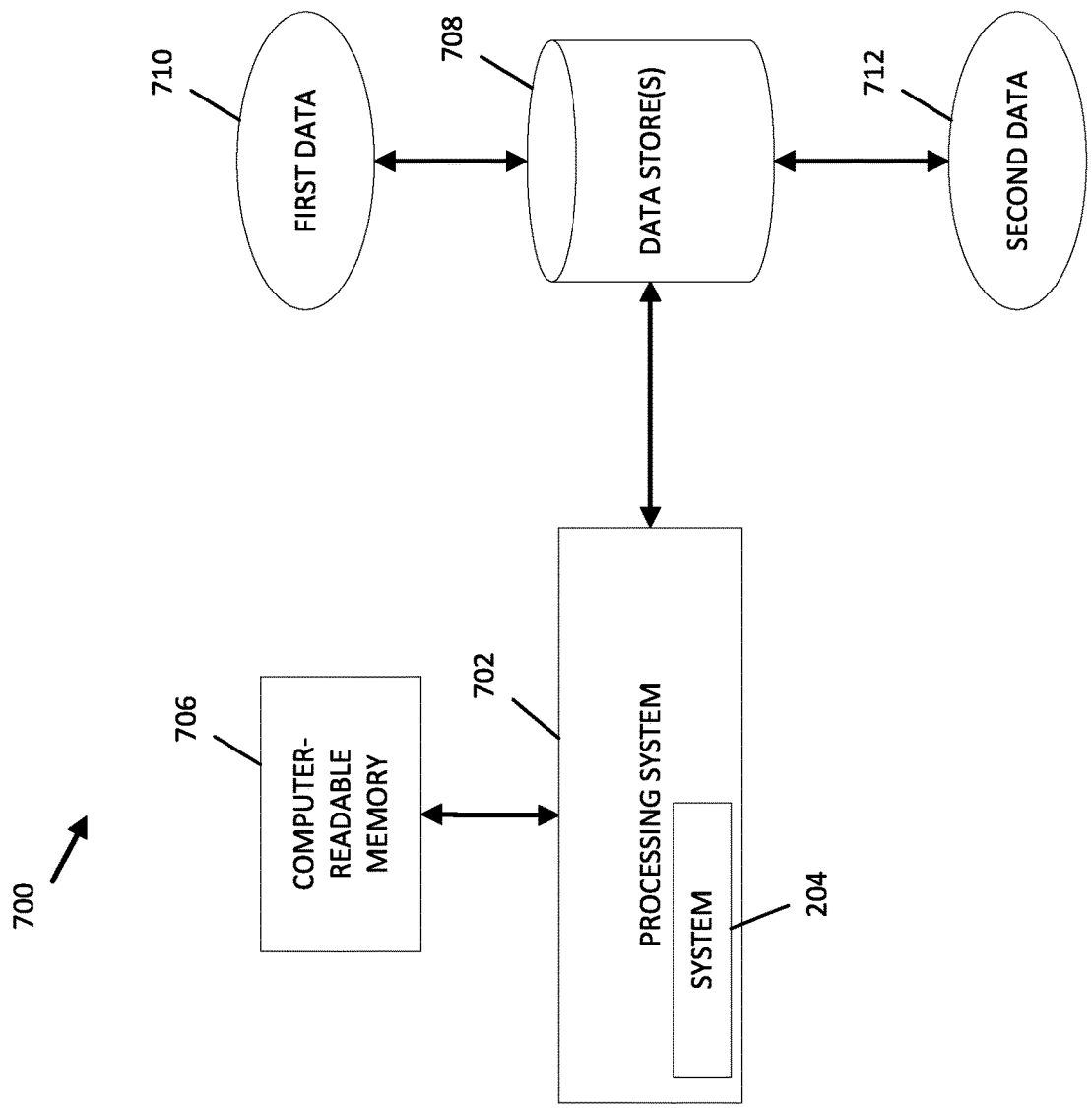
FIGS. 7A, 7B, and 7C depict example systems for use in implementing an automated question generation system.
Figure 7B:
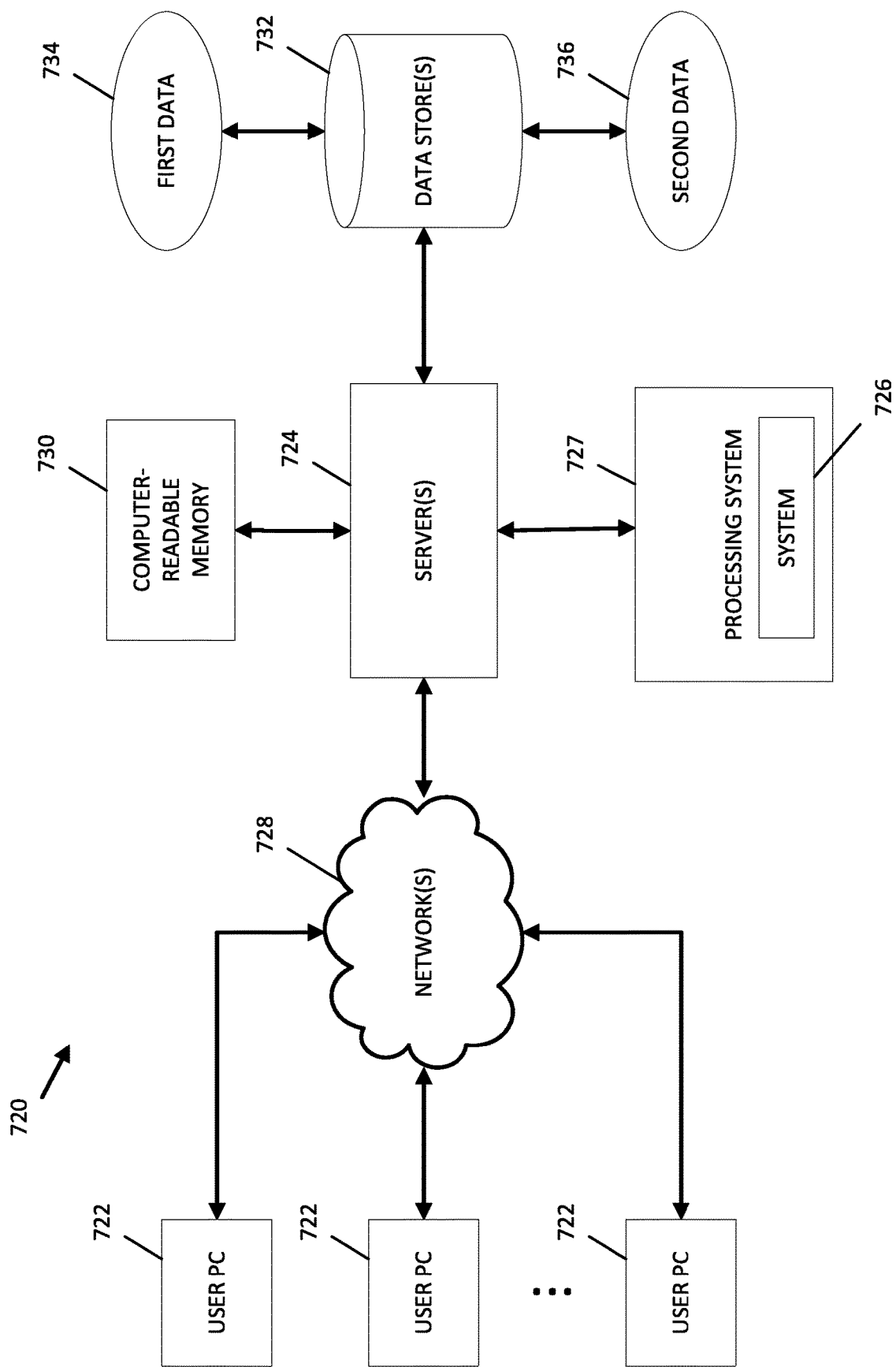
Figure 7C:
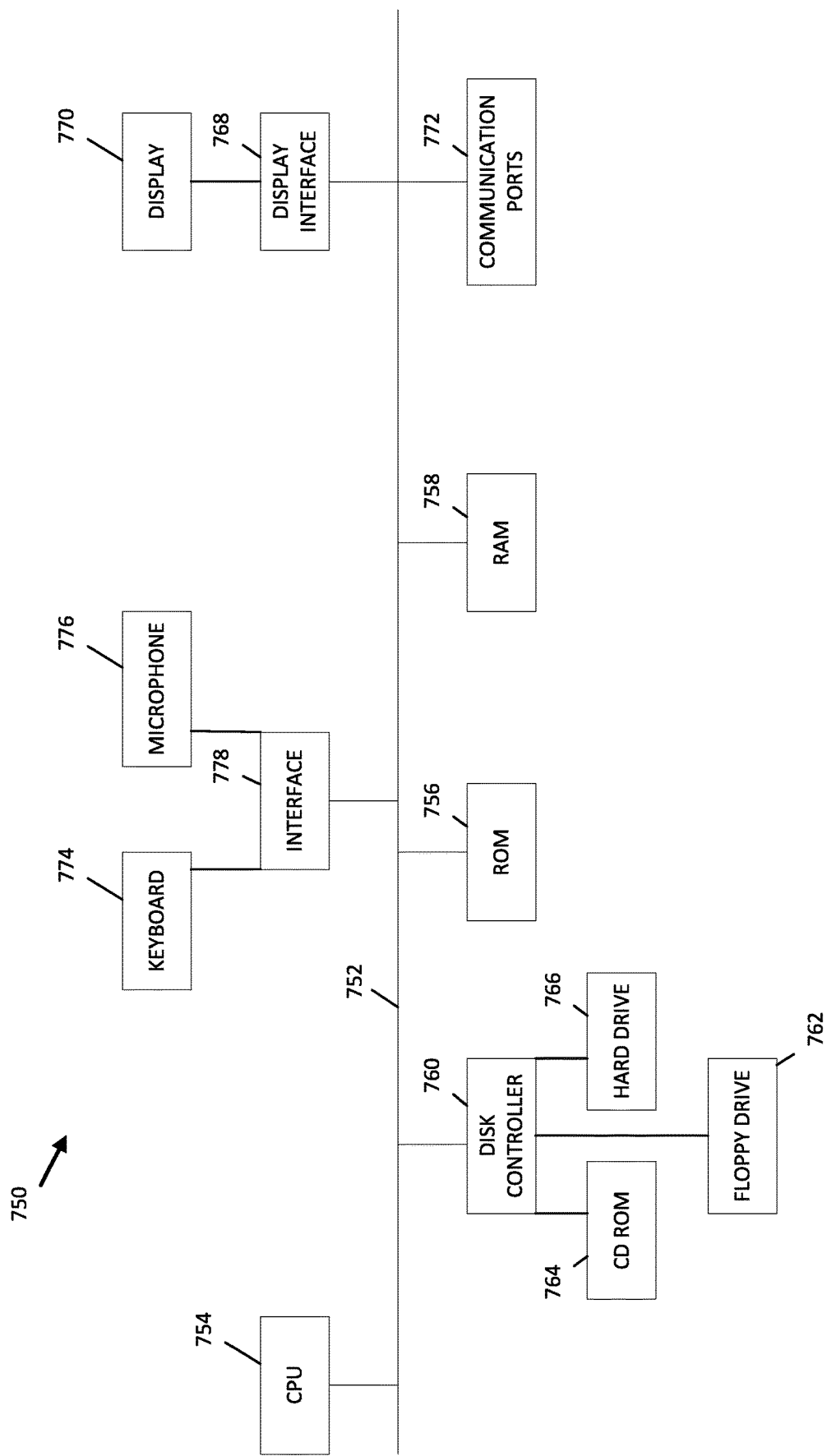

FIGS. 7A, 7B, and 7C depict example systems for use in implementing a system. For example, FIG. 7A depicts an exemplary system 700 that includes a standalone computer architecture where a processing system 702 (e.g., one or more computer processors) includes a system 704 being executed on it. The processing system 702 has access to a non-transitory computer-readable memory 706 in addition to one or more data stores 708. The one or more data stores 708 may contain first data 710 as well as second 712.

FIG. 7B depicts a system 720 that includes a client server architecture. One or more user PCs 722 access one or more servers 724 running a system 726 on a processing system 727 via one or more networks 728. The one or more servers 724 may access a non-transitory computer readable memory 730 as well as one or more data stores 732. The one or more data stores 732 may contain first data 734 as well as second data 736.

FIG. 7C shows a block diagram of exemplary hardware for a standalone computer architecture 750, such as the architecture depicted in FIG. 7A, that may be used to contain and/or implement the program instructions of system embodiments of the present invention. A bus 752 may serve as the information highway interconnecting the other illustrated components of the hardware. A processing system 754 labeled CPU (central processing unit) (e.g., one or more computer processors), may perform calculations and logic operations required to execute a program. A non-transitory computer-readable storage medium, such as read only memory (ROM) 756 and random access memory (RAM) 758, may be in communication with the processing system 754 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 760 interfaces one or more optional disk drives to the system bus 752. These disk drives may be external or internal floppy disk drives such as 762, external or internal CD-ROM, CD-R, CD-RW or DVD drives such as 764, or external or internal hard drives 766. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 760, the ROM 756 and/or the RAM 758. Preferably, the processor 754 may access each component as required.

A display interface 778 may permit information from the bus 752 to be displayed on a display 770 in audio, graphic, or alphanumeric format. Communication with external devices may optionally occur using various communication ports 772.

In addition to the standard computer-type components, the hardware may also include data input devices, such as a keyboard 774, or other input device 776, such as a microphone, remote control, pointer, mouse and/or joystick.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes the plural reference unless the context clearly dictates otherwise. Also, as used in the description herein and throughout the claims that follow, the meaning of "in" includes "on" unless that context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate a situation where only the disjunctive meaning may apply.

The invention has been described with reference to particular exemplary embodiments. However, it will be readily apparent to those skilled in the art that it is possible to embody the invention in specific forms other than those of the exemplary embodiments described above. The embodiments are merely illustrative and should not be considered restrictive. The scope of the invention is reflected in the claims, rather than the preceding description, and all variations and equivalents which fall within the range of the claims are intended to be embraced therein.

It is claimed:

1. A computer-implemented method for automatically generating one or more questions from text, comprising:
   (a) receiving text including one or more sentences;
   (b) parsing a sentence from the text, wherein the sentence comprises a predicate and one or more arguments associated with the predicate;
   (c) assigning semantic role labels to the one or more arguments associated with the predicate; and
   (d) automatically generating one or more questions relating to the predicate based on the assigned semantic role labels, the automatically generating comprising: determining a focal argument among the one or more arguments and determining a type of question among a plurality of different question types based on the determined focal argument, wherein each answer to the one or more questions is one of the one or more arguments associated with the predicate.

2. The computer-implemented method of claim 1, further comprising:
   (e) when the sentence comprises more than one predicate, repeating (c)-(d) for a next predicate and associated arguments until one or more questions are generated for each predicate in the sentence; and
   (f) when the text comprises more than one sentence, repeating (b)-(e) for a next sentence until one or more questions are generated for each predicate in each sentence.

3. The computer-implemented method of claim 1, wherein generating one or more questions comprises detecting one or more verbal groups in the sentence corresponding to the predicate and analyzing tense, grammatical aspect, verb negation, modality, and grammatical voice of each of the detected verbal groups.

4. The computer-implemented method of claim 1, wherein the sentence is comprised of at least one preposition, wherein generating one or more questions for the predicate comprises retaining the at least one preposition for use in the one or more questions.

5. The computer-implemented method of claim 1, wherein the one or more questions include constituent questions.

6. The computer-implemented method of claim 1, wherein the one or more questions include yes-or-no questions.

7. The computer-implemented method of claim 1, further comprising providing the one or more questions to a user for evaluation.

8. A computer-implemented system for automatically generating one or more questions from text, comprising:
   one or more data processors;
   one or more computer-readable storage mediums encoded with instructions for commanding the one or more data processors to execute steps that include:
   (a) receiving text including one or more sentences;
   (b) parsing a sentence from the text, wherein the sentence comprises a predicate and one or more arguments associated with the predicate;
   (c) assigning semantic role labels to the one or more arguments associated with the predicate; and
   (d) automatically generating one or more questions relating to the predicate based on the assigned semantic role labels, the automatically generating comprising: determining a focal argument among the one or more arguments and determining a type of question among a plurality of different question types based on the determined focal argument, wherein each answer to the one or more questions is one of the one or more arguments associated with the predicate.

9. The computer-implemented system of claim 8, further comprising instructions for commanding the one or more data processors to execute steps that include:
   (e) when the sentence comprises more than one predicate, repeating (c)-(d) for a next predicate and associated arguments until one or more questions are generated for each predicate in the sentence; and
   (f) when the text comprises more than one sentence, repeating (b)-(e) for a next sentence until one or more questions are generated for each predicate in each sentence.

10. The computer-implemented system of claim 8, wherein generating one or more questions comprises detecting one or more verbal groups in the sentence corresponding to the predicate and analyzing tense, grammatical aspect, verb negation, modality, and grammatical voice of each of the detected verbal groups.

11. The computer-implemented system of claim 8, wherein the sentence is comprised of at least one preposition, wherein generating one or more questions for the predicate comprises retaining the at least one preposition for use in the one or more questions.

12. The computer-implemented system of claim 8, wherein the one or more questions include constituent questions.

13. The computer-implemented system of claim 8, wherein the one or more questions include yes-or-no questions.

14. The computer-implemented system of claim 8, further comprising instructions for commanding the one or more data processors to execute steps that include providing the one or more questions to a user for evaluation.

15. A non-transitory computer-readable storage medium comprising instructions for which when executed cause a processing system to execute steps comprising:
   (a) receiving text including one or more sentences;
   (b) parsing a sentence from the text, wherein the sentence comprises a predicate and one or more arguments associated with the predicate;
   (c) assigning semantic role labels to the one or more arguments associated with the predicate; and
   (d) automatically generating one or more questions relating to the predicate based on the assigned semantic role labels, the automatically generating comprising: determining a focal argument among the one or more arguments and determining a type of question among a plurality of different question types based on the determined focal argument, wherein each answer to the one or more questions is one of the one or more arguments associated with the predicate.

16. The non-transitory computer-readable storage medium of claim 15, further comprising instructions for which when executed cause a processing system to execute steps comprising:
   (e) when the sentence comprises more than one predicate, repeating (c)-(d) for a next predicate and associated arguments until one or more questions are generated for each predicate in the sentence; and
   (f) when the text comprises more than one sentence, repeating (b)-(e) for a next sentence until one or more questions are generated for each predicate in each sentence.

17. The non-transitory computer-readable storage medium of claim 15, wherein generating one or more questions comprises detecting one or more verbal groups in the sentence corresponding to the predicate and analyzing tense, grammatical aspect, verb negation, modality, and grammatical voice of each of the detected verbal groups.

18. The non-transitory computer-readable storage medium of claim 15, wherein the sentence is comprised of at least one preposition, wherein generating one or more questions for each predicate comprises retaining the at least one preposition for use in the one or more questions.

19. The non-transitory computer-readable storage medium of claim 15, wherein the one or more questions include constituent questions.

20. The non-transitory computer-readable storage medium of claim 15, wherein the one or more questions include yes-or-no questions.

\* \* \* \* \*